Patented Feb. 10, 1948

2,435,777

UNITED STATES PATENT OFFICE 2,435,777

PREPARATION OF QUATERNARY AMMONIUM POLYACRYLATES

Frank J. Glavis, Elkins Park, and Harry T. Neher, Bristol, Pa., assignors to Röhm & Haas Company, Philadelphia, Pa., a corporation of Delaware No Drawing. Application January 31, 1945, Serial No. 575,566

15 Claims. (Cl. 252—77)

1

This invention relates to an improved method for the preparation of quaternary ammonium salts of polyacrylic acid and to the solutions of such salts obtained thereby. Such solutions are effective as such or upon dilution with water, glycols, or glycol ethers or mixtures thereof as hydraulic fluids for transmitting pressure and/or operating mechanisms.

Quaternary ammonium polyacrylates have not heretofore been studied and reported upon in the literature. Methods for their preparation suggested by analogy with procedures for producing other compounds are not necessarily operative nor suitable for producing products or solutions of products for use in hydraulic fluids. For example, the theoretical method of preparing monomeric quaternary ammonium acrylates and polymerizing them fails to yield a useful polymer. On the other hand, some methods involving metathesis yield impure products carrying objectionable contaminants. Other methods require complicated procedures and the handling of corrosive substances.

We have discovered a method whereby quaternary ammonium salts of polyacrylic acid are readily and conveniently obtained in a form free of objectionable properties and capable of use in a new type of hydraulic fluid with peculiar advantage. Our method comprises preparing a quaternary ammonium hydroxide in methoxymethoxyethanol, methoxyethoxyethanol, or mixtures thereof, combining the quaternary ammonium hydroxide in said solvent medium with a polymerized ester of acrylic acid, and reacting said hydroxide and said ester. This procedure yields a quaternary ammonium salt of polyacrylic acid which is free of corrosive salts, corrosive acids, excessive alkali, decomposition products, or other objectionable materials. The secondary reaction product, the alcohol from the ester, may be left in the solution or separated therefrom.

The quaternary ammonium polyacrylates are usually obtained dissolved in methoxyethoxyethanol, methoxymethoxyethanol, or a mixture of these two solvents, with or without water. Water is inevitably present when aqueous dispersions of polyesters are used. If the saponification reaction is effected in an anhydrous system, it sometimes happens that the quaternary ammonium polyacrylate precipitates in an exceptionally pure form, which may be separated and taken up in any solvent or combination of solvents desired. On the other hand, the pure quaternary ammonium polyacrylate may be dissolved

2 in the original solvent by addition of water thereto. The solutions obtained by our method of preparation are suitable as hydraulic fluids or may be used for the preparation of hydraulic fluids.

For this purpose, the quaternary ammonium polyacrylate solution may be adjusted as to concentration with liquids such as water, alkylene glycols, polyalkylene glycols, glycerine, lower alkyl ethers of such glycols, and mixtures thereof. The pH of such solutions may be adjusted without introduction of an amount of impurity which is of consequence. The quaternary ammonium polyacrylates may be supplemented with antioxidants, anticorrosive agents, or other additives if so desired. These solutions of the quaternary ammonium polyacrylates as prepared according to this invention are hydraulic fluids of exceptional merit.

The hydraulic fluids prepared from quaternary ammonium polyacrylates and polymethacrylates in solution in the various solvents mentioned above are being claimed in copending application Serial No. 576,142, filed February 3, 1945, allowed December 12, 1947. The instant application is directed to a peculiarly advantageous method for the preparation of certain quaternary ammonium polyacrylates and to the products thus obtained which are especially desirable for the preparation of hydraulic fluids as described above.

As a polymeric ester of acrylic acid, there may be used any saponifiable or hydrolyzable polyacrylic ester. For convenience of preparation and for availability, the esters of aliphatic alcohols are suggested, particularly the open chain alcohols of one to four carbon atoms, methyl, ethyl, propyl, and butyl. While saponifiable esters of other alcohols may be used, they offer no advantage, since in most instances the alcohol formed in the reaction is either volatilized or otherwise separated from the solution of quaternary ammonium polyacrylate which is formed.

The polymeric ester may be prepared in various forms by conventional methods. While the polymerization of a monomeric ester may be carried out in a number of ways, it is preferred to prepare the polymer in the form of an aqueous suspension by known methods. There may, however, be used finely divided material or solutions in non-reactive organic solvents.

Esters of primary aliphatic alcohols form the basis for the preferred class of saponifiable polymeric acrylic esters, because of the ease with which they are saponified. Of these polyesters, the polymers of methyl acrylate and ethyl acrylate and copolymers having a major proportion of methyl or ethyl acrylate groups are the polymers of preference, since they provide the highest proportion of polyacrylate to alcohol, are readily obtained in a pure form, and are readily polymerized to almost any degree of molecular size. Although size is not critical, different size polymers may be desired in different applications.

The indicated preference for the polymers in the form of aqueous dispersions or suspensions is based on the ease of reaction in this form with the quaternary ammonium hydroxides in methoxymethoxyethanol or methoxyethoxyethanol. The reaction begins even at room temperature, is hastened as the temperature is raised, and readily carried to comparative completion at temperatures up to 110° C. in a reasonable time. In the particular solvents specified, the reaction can be carried to practical completion without resorting to severe conditions of reaction or reaction conditions which cause decomposition of the quaternary ammonium hydroxide or salt or formation of undesired and deleterious by-products. When the quaternary ammonium polyacrylate has once been formed by our method, it is surprisingly stable both to thermal and to mechanical treatments.

It is a further feature of this invention that the polymeric acrylic esters may be rendered soluble in di- and tri-hydric alcohols and their mono- and di-ethers and mixtures thereof with water by saponifying only that fraction of the ester groups sufficient to render them thus soluble. The partially saponified, water- and glycol-soluble polymeric acrylic esters impart viscosity to these solutions at relatively low concentrations. The viscosity-temperature relationships thereof are very favorable.

In place of the polymers of pure esters of aliphatic alcohols, particularly primary alcohols, and acrylic acid, there may be used copolymers of these esters and other ethenoids, such as copolymers of esters of acrylic acid and of esters of methacrylic acid, copolymers of esters of acrylic acid and methacrylic acid, copolymers of esters of acrylic acid and styrene, copolymers of esters of acrylic acid and vinyl chloride, and copolymers of acrylic acid esters and butadiene and other diolefins, and other copolymers wherein the proportion of acrylic acid ester is sufficient to permit saponification to an extent which renders the saponified copolymer soluble in glycols, glycol ethers, and water. Copolymers provide interesting and valuable variations in properties of the hydraulic fluids made therewith.

Any quaternary ammonium hydroxide which is stable and is soluble in methoxymethoxyethanol or methoxyethoxyethanol may be used. Such hydroxide is prepared directly in one or more of the specified solvents from the corresponding quaternary ammonium halide. We have found that this method is peculiarly advantageous in that concentrated solutions of quaternary ammonium hydroxides can be thus prepared essentially free from salt.

The quaternary ammonium halide is dissolved in methoxymethoxyethanol or methoxyethoxyethanol or a mixture of these solvents. The resulting solution is then treated with an approximately equivalent amount of an alkali metal hydroxide. Alkali metal hydroxides have sufficient solubility in the solvents specified to react readily. Yet the alkali metal halides are insoluble therein and precipitate in a form in which they are separable from the reaction mixture. The quaternary ammonium hydroxide remains in solution. Simple filtration or centrifuging gives a solution of highly pure hydroxide.

These solutions of quaternary ammonium hydroxides have the interesting and valuable property of promoting substantially complete reaction with a polyacrylic ester. The quaternary ammonium hydroxide is used up without formation of undesirable by-products. This is in contrast with the somewhat anomalous behavior of quaternary ammonium hydroxides prepared by other known methods which are only 70% to 90% effective in the saponification of esters on the basis of titratable alkalinity and leave excessive free alkalinity in the product.

Water-soluble quaternary ammonium halides with aliphatically bound substituents none of which contains more than ten carbon atoms yield quaternary ammonium hydroxides which are generally soluble in methoxymethoxyethanol, methoxyethoxyethanol, or mixtures of these with water. The quaternary ammonium halides which may be utilized for the preparation of hydroxides in this invention are quaternary ammonium chlorides and bromides and their equivalents which are soluble in water and in which the N-substituents other than the anion are bound by aliphatic linkages to the quaternary ammonium nitrogen. The substituent groups may be aliphatic, arylaliphatic, or cycloaliphatic. Typical substituent groups are methyl, ethyl, propyl, allyl, methallyl, butyl, hexyl, octyl, decyl, benzyl, methylbenzyl, tetrahydrobenzyl, hexahydrobenzyl, and the like. In general, no substituent group should have over ten carbon atoms. In place of the above hydrocarbon groups, the quaternary ammonium group may contain a neutral substituent such as hydroxyl or ether groups, including hydroxyethyl, hydroxypropyl, methoxyethyl, ethoxyethyl, phenoxyethyl, phenoxyethoxyethyl, or the like.

Typical quaternary ammonium halides which meet the above requirements and may be used in this invention are tetramethyl ammonium bromide, trimethyl benzyl ammonium chloride, dimethyl dibenzyl ammonium chloride, trimethyl hydroxyethyl ammonium bromide, dimethyl dihydroxyethyl ammonium chloride, benzyl triethyl ammonium chloride, butyl dimethyl benzyl ammonium chloride, hexyl trimethyl ammonium bromide, octyl dimethyl benzyl ammonium chloride, decyl dimethyl benzyl ammonium chloride, phenoxyethyl dimethyl benzyl ammonium chloride, phenoxyethoxyethyl dimethyl benzyl ammonium chloride, tri(hydroxyethyl) benzyl ammonium chloride, tetra(hydroxyethyl) ammonium bromide, 2-ethylhexyl trimethyl ammonium bromide, etc.

As alkali metal hydroxides, there have been successfully used lithium, sodium, and potassium hydroxides. Since sodium hydroxide is the cheapest, it is preferred.

The reaction between quaternary ammonium halide and alkali metal hydroxide in methoxymethoxyethanol or methoxyethoxyethanol may be effected simply by dissolving one or both of these starting materials in the solvent and allowing time for the salt formed in the reaction to separate out. In one method, the halide may be dissolved and solid caustic, preferably in a finely divided form, added thereto. This mixture may be shaken or stirred at room temperature or at temperatures up to steam bath temperatures. If the reaction mixture has been warmed, it is preferred to cool the solution before the precipitate of salt is separated as this procedural step ensures the minimum halide content. In yet another variation, both halide and hydroxide may be dissolved separately and their solutions combined. Agitation or gentle heating will then cause the salt to precipitate in a readily separable form.

The reaction of polymeric ester and quaternary ammonium hydroxide solution may be carried out over a wide range of temperatures. Reaction begins even at room temperature (20°–25° C.). It is accelerated with heat, and practically complete utilization of the hydroxide can be effected in a few hours at 90° to 110° C.

The quaternary ammonium polyacrylates may be prepared over a wide range of concentrations, the upper limit being fixed only by questions of saturation and convenience. The more concentrated solutions may be used as the source of polymer for hydraulic fluids and suitably diluted.

The viscosity of the solutions at several temperatures gives one index of their value for such purpose. Evaluation may be based on changes in viscosity with temperature at a concentration of solution which gives a desired viscosity at a selected temperature. Since it is tedious to attempt to adjust solutions to a fixed viscosity, such comparisons generally rest on interpolated values. Comparisons may also be made through the use of temperature-viscosity coefficients, here designated by "C." Subscripts and superscripts following "C" indicate the temperatures used in determining this coefficient. Thus, $$C_{t_2}^{t_1} = 1 - \frac{\text{viscosity at } t_1}{\text{viscosity at } t_2}$$

Typical values for this coefficient are recorded below for some of the solutions prepared from applicants' products.

The preparation of quaternary ammonium polyacrylates in solutions comprising methoxymethoxyethanol or methoxyethoxyethanol is illustrated in the following examples.

*Example 1*

A solution of a quaternary ammonium salt was prepared by agitating 35 parts by weight of trimethyl benzyl ammonium chloride in 204 parts by weight of methoxymethoxyethanol. There was then added 7.5 parts of flake sodium hydroxide, and agitation was continued for three hours at room temperature. The salt which had separated was removed by filtration under suction. The residue of salt on the filter was dried and found to weigh over ten parts. The solution was found to be almost free of chloride.

A portion of this solution, 119 parts by weight, was mixed with 31.5 parts of an aqueous suspension of polymerized methyl acrylate containing 36.5% of solids. The mixture was stirred and heated at about 100° C. to 110° C. for two hours. At the end of this time, it was found that less than a half per cent of the base remained. The product was a solution of trimethyl benzyl ammonium polyacrylate dissolved in methoxymethoxyethanol and water, since the methanol had been volatilized during the heating.

The product was adjusted to contain 7% of the polyacrylate, 68% of methoxymethoxyethanol, and 25% of water. The viscosity of this solution was 28.9 centistokes at 100° F. and 7.1 centistokes at 210° F., giving a slope for the viscosity-temperature curve on the A. S. T. M. (D341-37T) kinematic viscosity chart of 0.56. The $C_{100}^{210}$ value is 0.76. The melting point of the mixture was −50° F. The solution possessed properties which are requisite for a good hydraulic fluid, including lubricating properties.

*Example 2*

A solution of 127 parts of benzyl chloride in 394 parts of methoxyethoxyethanol was placed in an autoclave and 75 parts of trimethylamine run in under pressure, while the reaction mixture was heated at 90° C. The solution was then found by analysis to contain 32.1% of trimethyl benzyl ammonium chloride. To this solution was added 40 parts of flake caustic, and the mixture was then stirred for two hours at 45° C. The reaction mixture was then cooled and filtered through a thin bed of purified diatomaceous earth. A clear filtrate was obtained containing 24.4% of trimethyl benzyl ammonium hydroxide and less than 0.2 per cent of chlorides.

A reaction vessel equipped with a stirrer was charged with 342 parts of the above hydroxide solution, 119 parts of a dispersion of polymerized methyl acrylate containing 36.1% of solids, and 150 parts of water. This mixture was stirred and was heated up to 100° C. for a period of three and a half hours. Within this time, 98% of the hydroxide had been used up.

The solution thus obtained contained trimethyl benzyl ammonium polyacrylate in a stable form, which was useful for imparting the proper consistency to hydraulic fluids and possessed lubricating properties.

A solution prepared to contain 1.7% of the above polymer in a mixture of 55 parts of ethylene glycol, 40 parts of water, and 5 parts of methoxyethoxyethanol was found to have a viscosity of 10 centistokes at 130° F. and 1025 centistokes at −40° F. The $C_{-40}^{130}$ value is 0.9903.

*Example 3*

A solution of 108 parts of trimethyl benzyl ammonium chloride in 202 parts of a mixture of methoxymethoxyethanol and methoxyethoxyethanol was prepared by shaking with slight warming. Thereupon, 22 parts of sodium hydroxide was added and the resulting mixture stirred and heated at 45° to 50° C. for two hours. At the end of this period, the reaction mixture was cooled and filtered through filter paper. The precipitated salt was completely removed. It is interesting to note that whereas an aqueous solution of quaternary ammonium hydroxide would attack the filter paper, the solvent solution used here (and in other examples) permits effective and efficient filtration through cellulosic material, thus permitting convenient removal of salt. The solution obtained contained 23.4% of pure trimethyl benzyl ammonium hydroxide which was almost free of chloride.

A portion of 43 parts of this hydroxide solution and 59 parts of a 21.1% dispersion of polymeric ethyl acrylate were heated together for two hours. At the end of this period, it was found that all of the hydroxide had reacted and that the resulting polymeric product was completely soluble in the solution containing the above organic solvents and water.

The solution was adjusted to contain 7% of the quaternary ammonium polyacrylate, which still contained ethyl ester groups, 68% of the solvent mixture, and 25% of water. This solution had a viscosity of 32,716 centistokes at 100° F. and 6,361 centistokes at 210° F., giving an A. S. T. M. slope of 0.19. The melting point was —50° F. The $C_{100}^{210}$ value is 0.80.

Example 4

A solution of 114 parts of trimethyl benzyl ammonium chloride in 211 parts of methoxymethoxyethanol was made and 28 parts of flake sodium hydroxide added thereto. This mixture was shaken for several hours. It was then cooled and filtered free of suspended matter. The resulting solution contained 32.8% of trimethyl benzyl ammonium hydroxide dissolved in the methoxymethoxyethanol.

Of this solution 89 parts were mixed with 77 parts of an aqueous dispersion of butyl polyacrylate containing 29.1% of solids. This mixture was stirred and heated on a water bath for four hours. The hydroxide had been substantially consumed and what remained was neutralized with a little phosphoric acid.

A solution of 2.2% solids prepared with a solvent of 55 parts of ethylene glycol and 45 parts of water had a viscosity of 10 centistokes at 210° F. and of 31 centistokes at 100° C., giving an A. S. T. M. slope of 0.42. The $C_{100}^{210}$ value is 0.68.

Example 5

A solution of 24.4% of trimethyl benzyl ammonium hydroxide prepared in methoxyethoxyethanol (110 parts) was mixed with a toluene solution of 14 parts of polymeric methyl acrylate in 119 parts of the solvent. The mixture was stirred and heated at 100°–110° C. and some polymer separated. Thereupon, some water was added and a toluene-water distillate taken off. In two hours, a homogeneous liquid was obtained and the conversion had reached 98%.

The polymer was adjusted to 7.5% with glycol and water. The solvent consisted of 30 parts of glycol, 48 parts of water, and 22 parts of methoxyethoxyethanol. This solution had a viscosity of 10 centistokes at 210° F. and of 37.5 centistokes at 100° F., giving a slope of 0.48. The $C_{100}^{210}$ value is 0.73.

Example 6

A solution of 16 parts of flake sodium hydroxide was made in 100 parts of methoxymethoxyethanol. A separate solution of trimethyl benzyl ammonium chloride was prepared from a solution of 400 parts of methoxymethoxyethanol and 126.5 parts of benzyl chloride into which was run under pressure in an autoclave 58 parts of trimethylamine, the mixture being heated to 90° C. The two solutions were mixed and the resulting solution agitated at room temperature for about an hour and a half. The solution was then centrifuged. The salt obtained was washed and dried. It had a weight of over 22 parts. The solution contained 16.5% of the quaternary ammonium hydroxide.

A portion of 270 parts of this and 73.5 parts of an aqueous dispersion of polymeric methyl acrylate of 36.5% solids was heated at 90° to 100° C. for about two hours, at which time a conversion of 98.6% had been obtained. The resulting solution was adjusted to a solids content of 7%, a solvent content of 68%, and a water content of 25%. The adjusted solution had a viscosity of 27.7 centistokes at 100° F., a viscosity of 7.0 centistokes at 210° F., an A. S. T. M. slope of 0.55, and a freezing point of —50° F. The $C_{100}^{210}$ value is 0.75.

When the aqueous dispersion of polymeric methyl acrylate is heated at 100° C. with trimethyl benzyl ammonium hydroxide prepared in an aqueous system, such as has been available heretofore, the conversion never approaches completeness. For example, a mixture was heated for three hours at 100° C. with a conversion of 86.5%. Heating for eighteen hours at 100° C. gave only 90% conversion. The solutions still contained a large and objectionable amount of free alkali. If such alkalinity were neutralized with acid, an objectionable amount of salt would be introduced.

In another series of tests, saponification of dispersions of polymerized methyl acrylate was attempted with mixtures of methoxymethoxyethanol and aqueous trimethyl benzyl ammonium hydroxide prepared by a conventional procedure. These reactions mixtures simulated those used in this invention, but in three hours and a half of heating at 100° C. only 86.3% conversion was obtained. The large amount of free alkali was definitely objectionable.

Example 7

A solution of 108 parts of trimethyl benzyl ammonium chloride was made in 202 parts of methoxymethoxyethanol and treated with 22 parts of sodium hydroxide at about 50° C. The reaction product was cooled and filtered to give a clear filtrate.

A portion of 22 parts of this filtrate was mixed with 59 parts of an aqueous dispersion of ethyl acrylate, which had been polymerized to a state of high molecular weight. Since the reaction mixture became very thick as the reaction proceeded, 100 parts of methoxymethoxyethanol was added during the course of the reaction. Heating was continued for five hours at about 100° C. The hydroxide had then been used up by the reaction with the polymeric ester. The resulting product was completely soluble in the methoxymethoxyethanol and water mixture. Of the ester groups of the original polymer, 25% had been hydrolyzed. Yet the whole molecule or chain had been rendered soluble in aqueous media.

The product was adjusted with water and methoxyethoxyethanol to contain 7% solids and 25% of water. The resulting solution had a viscosity of 17,800 centistokes at 100° F., 4,490 centistokes at 210° F., and an A. S. T. M. slope of 0.16. The $C_{100}^{210}$ value is 0.75.

Example 8

A mixture of 75 parts of triethanolamine and 40 parts of ethylene chlorohydrin was heated for ten hours at about 100° C. The quaternary ammonium chloride was obtained as a light brown solid which was filtered off. A solution of 26 parts of this solid was prepared in 100 parts of methoxymethoxyethanol and 4.4 parts of flake caustic added. The reaction mixture was shaken for hour hours and filtered. The clear solution resulting contained 18.3% of tetraethanol ammonium hydroxide.

A portion of 110 parts of this hydroxide solution was mixed with 23.5 parts of an aqueous 36.5% dispersion of polymeric methyl acrylate. The mixture was stirred and heated for two hours at 100° C. By this time, 99.5% conversion had resulted.

In contrast, saponification of a portion of the same dispersion heated at the same temperature with an equivalent amount of an aqueous, commercial tetraethanol ammonium hydroxide gave only 72% conversion in two hours and only 78% after eighteen hours, leaving an excessive amount of free alkali in the solution, thus rendering it unfit for use in the usual hydraulic system without neutralization.

Example 9

A solution of 29 parts of octyl bromide in 150 parts of methoxymethoxyethanol was treated under pressure with 25 parts of trimethylamine. The resulting solution was treated with six parts of sodium hydroxide. The salt formed was filtered off and the resulting solution of octyl trimethyl ammonium hydroxide mixed with 26 parts of an aqueous 34.9% dispersion of polymerized methyl acrylate. This mixture was heated at 90° to 100° C. for about four hours, at which time only 2.4% of the hydroxide remained.

This solution was diluted to one of 4% solids with a mixture of 55 parts of ethylene glycol and 45 parts of water. It had a viscosity of 2.5 centistokes at 130° F. and 272 centistokes at —40° F. The $\frac{C_{-40}^{130}}{}$ value is 0.9908.

Example 10

A solution of dimethyl diethanol ammonium chloride was prepared in methoxymethoxyethanol and treated with an equivalent weight of potassium hydroxide. The salt formed was separated and the clear solutions of the corresponding hydroxide mixed with an aqueous 32.5% dispersion of polymeric methyl acrylate in equivalent amounts. The mixture was heated for two and a half hours at 90° to 100° C. At this time, titration showed only four per cent of the original alkali remained.

The product was soluble in a mixture of equal weights of dimethoxytetraethylene glycol and water, giving solutions of suitable consistency for hydraulic fluids.

Example 11

A mixture of 44.5 parts of dimethyl ethanolamine, 67 parts of benzyl chloride, and 200 parts of methoxymethoxyethanol was heated at 90° C. for two hours. To this solution was added 20 parts of sodium hydroxide, and the resulting mixture was stirred and heated at 30° C. for two and one-half hours. It was then cooled and filtered free from salt.

A mixture of 164 parts of the dimethyl hydroxyethyl benzyl ammonium hydroxide (34.2%) thus obtained and of 72 parts of an aqueous 35.8% dispersion of polymeric methyl acrylate in a molar ratio of 0.8 to 1 of hydroxide to acrylate was heated at 100° C. for about two and a half hours. At this time, only about two per cent of the hydroxide remained, and the hydrolysis was interrupted by cooling. The product could be extended with a mixture of water and methoxymethoxyethanol or glycols, or their ethers, to give homogeneous solutions.

Example 12

A solution of 202 parts of trimethyl benzyl ammonium chloride was made in 394 parts of methoxyethoxyethanol and treated with 40 parts of sodium hydroxide. After this mixture had been stirred for three hours and slightly warmed, it was cooled and filtered. The clear filtrate contained essentially pure quaternary ammonium hydroxide at 24.4% concentration with only about 0.2 per cent of chloride in solution.

A mixture was made of 64 parts of this solution and 72 parts of an aqueous 29.1% dispersion of polymeric butyl acrylate and 75 parts of water and warmed and stirred for about eight hours, at which time the conversion was found 98% complete.

Example 13

A solution (570 parts) of trimethyl benzyl ammonium hydroxide (23.1%) in methoxymethoxyethanol was mixed with 240 parts of an aqueous 35.9% dispersion of polymethyl acrylate and vigorously shaken at room temperature for five minutes. Titration showed that 68% of the hydroxide had reacted. The mixture was then gradually heated to 110° C., at which time 99% of the hydroxide had reacted.

When the product was adjusted to give a solution of 7% solids in a solution with 68% of methoxymethoxyethanol and 25% of water, a viscosity of 20 centistokes was found at 100° F. and of 4.9 centistokes at 210° F. The value of $\frac{C_{100}^{210}}{}$ is 0.75.

Example 14

A solution of 108 parts of trimethyl benzyl ammonium chloride in 202 parts of methoxymethoxyethanol was agitated with 22 parts of flake sodium hydroxide for two hours at 45°-50° C., cooled, and filtered. The resulting clear filtrate contained 23.4% of trimethyl benzyl ammonium hydroxide.

To 110 parts of this solution was added 1069 parts of an aqueous dispersion of a copolymer of butyl methacrylate and methyl acrylate in equal proportions by weight, containing 16.2% of solids. The reaction mixture was stirred and heated at about 100° C. After two hours, it was found that the hydroxide had been entirely consumed. Thereupon, 363 additional parts of the hydroxide solution was added and heating and stirring continued for four hours. At this point, it was found that hydroxide had been consumed equivalent to the amount of polymethyl acrylate in the original dispersion. The product was a solution of a polymer still containing the butyl methacrylate groups, solubilized by the presence of quaternary ammonium acrylate chains or groups.

When a portion of the product was heated at 100° C. for another two hours with an amount of hydroxide sufficient to saponify the butyl methacrylate chains, no saponification was found.

Example 15

To a solution of 257 parts of benzyl chloride in 810 parts of methoxyethoxyethanol was added 115 parts of trimethylamine under pressure in an autoclave maintained at 90° C. A portion of 150 parts of the resulting quaternary ammonium solution was treated with 17 parts of solid potassium hydroxide, assaying 85% caustic. The mixture was agitated for three hours, at the end of which time the formation of salt was essentially completed. The mixture was filtered to give a clear solution containing 23.2% of trimethyl benzyl ammonium hydroxide. There were then mixed 120 parts of this solution and 40.5 parts of a 35.5% dispersion of polymerized methyl acrylate, to which 75 parts of water was added. This reaction mixture was heated for four hours at 100° C. and 97.5% of the hydroxide had been consumed.

The reaction product in solution in methoxyethoxyethanol was taken up with a mixture of 55 parts of propylene glycol and 45 parts of water. At 7.2% of solids, the resulting fluid had viscosities of 10 centistokes at 210° F. and of 42 centistokes at 100° F., giving an A. S. T. M. slope of 0.51. The value of $$C^{210}_{100}$$

is 0.76.

We claim:

1. A process for preparing quaternary ammonium polyacrylates, the quaternary nitrogen atom of which carries neutral substituents selected from aliphatic, arylaliphatic, and cycloaliphatic groups of not over ten carbon atoms each bound to the quaternary nitrogen at a saturated carbon atom thereof, which comprises preparing a solution of the corresponding quaternary ammonium hydroxide in a solvent selected from the class consisting of methoxymethoxyethanol and methoxyethoxyethanol, combining said solution and a saponifiable ester of polyacrylic acid and a saturated lower aliphatic alcohol and reacting same to form a quaternary ammonium salt of polyacrylic acid.

2. A process for preparing quaternary ammonium polyacrylates, the quaternary nitrogen atom of which carries four neutral N-substituents having one to ten carbon atoms each selected from aliphatic, arylaliphatic, and cycloaliphatic groups bound at a saturated carbon atom thereof to the quaternary nitrogen, which comprises making a solution of the corresponding quaternary ammonium halide selected from the group consisting of the corresponding chloride and bromide in a solvent selected from the class consisting of methoxymethoxyethanol and methoxyethoxyethanol, reacting said solution with an alkali metal hydroxide to form the corresponding quaternary ammonium hydroxide and an alkali halide, removing said alkali halide from the reaction mixture, combining alkali halide-free reaction mixture with an ester of polyacrylic acid and a saturated lower aliphatic alcohol, and reacting same to form a quaternary ammonium salt of polyacrylic acid.

3. A process for preparing quaternary ammonium polyacrylates, the quaternary nitrogen of which has neutral substituents selected from aliphatic, arylaliphatic, and cycloaliphatic groups which are bound thereto at a saturated carbon atom thereof and which contain one to ten carbon atoms each, which comprises preparing a solution of the corresponding quaternary ammonium hydroxide in a solvent selected from the class consisting of methoxymethoxyethanol and methoxyethoxyethanol, and reacting said hydroxide in solution with a polymeric ester of acrylic acid and a saturated primary aliphatic alcohol of one to four carbon atoms.

4. A process for preparing quaternary ammonium polyacrylates, the quaternary nitrogen of which has neutral substituents selected from aliphatic, arylaliphatic, and cycloaliphatic groups which are bound thereto at a saturated carbon atom thereof and which contain one to ten carbon atoms each, which comprises making a solution of the corresponding quaternary ammonium halide selected from the group consisting of the corresponding chloride and bromide in a solvent selected from the class consisting of methoxymethoxyethanol and methoxyethoxyethanol, adding solid alkali metal hydroxide to said solution in an amount about equivalent to said halide, forming and separating an alkali halide from the reaction mixture, and reacting alkali halide-free reaction mixture with a polymeric ester of acrylic acid and a saturated primary aliphatic alcohol of one to four carbon atoms.

5. A process for preparing quaternary ammonium polyacrylates, the quaternary nitrogen of which has neutral substituents selected from aliphatic, arylaliphatic, and cycloaliphatic groups which are bound thereto at a saturated carbon atom thereof and which contain not over ten carbon atoms each, which comprises preparing a solution of the corresponding quaternary ammonium hydroxide in a solvent selected from the class consisting of methoxymethoxyethanol and methoxyethoxyethanol, combining said solution and an aqueous dispersion of a polymeric ester of acrylic acid and a saturated primary aliphatic alcohol of one to four carbon atoms, and saponifying said ester with said hydroxide.

6. A process for preparing quaternary ammonium polyacrylates, the quaternary nitrogen of which has neutral substituents selected from aliphatic, arylaliphatic, and cycloaliphatic groups which are bound thereto at a saturated carbon atom thereof and which contain not over ten carbon atoms each, which comprises preparing a solution of the corresponding quaternary ammonium hydroxide in a solvent selected from the class consisting of methoxymethoxyethanol and methoxyethoxyethanol, combining an aqueous dispersion of polymeric methyl acrylate with said solution of quaternary ammonium hydroxide in an amount not more than that equivalent to said acrylate, and saponifying said acrylate with said hydroxide.

7. A process for preparing quaternary ammonium polyacrylates, the quaternary nitrogen of which has neutral substituents selected from aliphatic, arylaliphatic, and cycloaliphatic groups which are bound thereto at a saturated carbon atom thereof and which contain not over ten carbon atoms each, which comprises preparing a solution of the corresponding quaternary ammonium hydroxide in a solvent selected from the class consisting of methoxymethoxyethanol and methoxyethoxyethanol, combining an aqueous dispersion of polymeric ethyl acrylate with said solution of quaternary ammonium hydroxide in an amount not more than that equivalent to said acrylate, and saponifying said acrylate with said hydroxide.

8. A process for preparing trimethyl benzyl ammonium polyacrylate which comprises preparing a solution of trimethyl benzyl ammonium hydroxide in a solvent selected from the class consisting of methoxymethoxyethanol and methoxyethoxyethanol, combining an aqueous dispersion of a polymeric ester of acrylic acid and a saturated primary aliphatic alcohol of one to four carbon atoms and said hydroxide in solution in an amount not more than that equivalent to said ester, and saponifying said ester with said hydroxide.

9. A process for preparing trimethyl benzyl ammonium polyacrylate which comprises preparing a solution of trimethyl benzyl ammonium hydroxide in a solvent selected from the class consisting of methoxymethoxyethanol and methoxyethoxyethanol, combining an aqueous dispersion of polymeric methyl acrylate and said hydroxide solution in an amount not more than that equivalent to said acrylate, and saponifying said ester with said hydroxide.

10. A process for preparing polymers having acrylic acid groups saponified with quaternary ammonium groups the N-substituents of which are selected from neutral aliphatic, arylaliphatic, and cycloaliphatic groups which are bound at a saturated carbon atom thereof to the quaternary nitrogen and have one to ten carbon atoms each, which comprises preparing a solution of the corresponding quaternary ammonium hydroxide in a solvent selected from the class consisting of methoxymethoxyethanol and methoxyethoxyethanol, combining an aqueous dispersion of a polymer having acrylic groups esterified with an aliphatic saturated primary alcohol of one to four carbon atoms and said solution of quaternary ammonium hydroxide in an amount not more than equivalent to said acrylic groups, and saponifying esterified acrylic groups in said polymer with said hydroxide.

11. A process for preparing polymers having trimethyl benzyl ammonium acrylate groups which comprises preparing a solution of trimethyl benzyl ammonium hydroxide in a solvent selected from the class consisting of methoxymethoxyethanol and methoxyethoxyethanol, combining an aqueous dispersion of a polymer having methyl acrylate groups and said solution of hydroxide in an amount not more than equivalent to the methyl acrylate groups, and saponifying said acrylate groups with said hydroxide.

12. A composition of matter consisting of a major proportion of a solvent selected from the class consisting of methoxymethoxyethanol and methoxyethoxyethanol and of a minor proportion of a polymer containing acrylic groups, sufficient of which are saponified with a quaternary ammonium group the N-substituents of which are selected from aliphatic, arylaliphatic, and cycloaliphatic groups which are bound at a saturated carbon atom thereof to the quaternary nitrogen and contain one to ten carbon atoms each to render the said polymer soluble in said solvent.

13. A composition of matter consisting of a major proportion of a solvent selected from the class consisting of methoxymethoxyethanol and methoxyethoxyethanol and of a minor proportion of a quaternary ammonium polyacrylate the N-substituents of which are selected from aliphatic, arylaliphatic, and cycloaliphatic groups which are bound at a saturated carbon atom thereof to the quaternary nitrogen and contain one to ten carbon atoms each, said polyacrylate being dissolved in said solvent.

14. A composition of matter consisting of trimethyl benzyl ammonium polyacrylate dissolved in a major proportion of methoxymethoxyethanol.

15. A composition of matter consisting of trimethyl benzyl ammonium polyacrylate dissolved in a a major proportion of methoxyethoxyethanol.

FRANZ J. GLAVIS.
HARRY T. NEHER.

REFERENCES CITED

The following references are of record in the file of this patent:

UNITED STATES PATENTS

| Number | Name | Date |
| --- | --- | --- |
| 2,078,256 | Lieber | Apr. 27, 1937 |
| 2,091,627 | Bruson | Aug. 31, 1937 |
| 2,104,796 | Dietrich | Jan. 11, 1938 |
| 2,146,209 | Graves | Feb. 7, 1939 |
| 2,162,454 | Guthmann | June 13, 1939 |